US012662098B2

(12) United States Patent
Schuster et al.

(10) Patent No.: US 12,662,098 B2
(45) Date of Patent: Jun. 23, 2026

(54) METHOD FOR OPERATING A BRAKING SYSTEM AND A BRAKING SYSTEM

(71) Applicant: Robert Bosch GmbH, Stuttgart (DE)

(72) Inventors: Markus Schuster, Helmstadt (DE); Florian Haag, Ellhofen (DE); Nikolas Loeffelmann, Dielheim (DE); Martin Marquart, Reichenbach (DE); Christian Schleinig, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 42 days.

(21) Appl. No.: 18/722,314

(22) PCT Filed: Dec. 21, 2022

(86) PCT No.: PCT/EP2022/087308
§ 371 (c)(1),
(2) Date: Jun. 20, 2024

(87) PCT Pub. No.: WO2023/118346
PCT Pub. Date: Jun. 29, 2023

(65) Prior Publication Data
US 2025/0074378 A1      Mar. 6, 2025

(30) Foreign Application Priority Data

Dec. 23, 2021      (DE) ..................... 10 2021 215 005.5

(51) Int. Cl.
B60T 13/66 (2006.01)
B60T 17/22 (2006.01)
(52) U.S. Cl.
CPC ............ B60T 13/662 (2013.01); B60T 17/22 (2013.01)

(58) Field of Classification Search
CPC .. B60T 13/662; B60T 17/22; B60T 2270/404; B60T 2270/82; B60T 13/06; B60T 13/686; B60T 7/042; B60Y 2400/01
(Continued)

(56) References Cited

U.S. PATENT DOCUMENTS

| 2009/0236903 A1* | 9/2009 | Nishino | .................... | B60T 8/96 |
| | | | | 303/3 |
| 2013/0173127 A1* | 7/2013 | Nakatsu | .................... | B60L 7/14 |
| | | | | 701/70 |

(Continued)

FOREIGN PATENT DOCUMENTS

| DE | 10 2009 001 135 A1 | 8/2010 |
| DE | 10 2016 208 966 A1 | 11/2017 |

(Continued)

OTHER PUBLICATIONS

International Search Report corresponding to PCT Application No. PCT/EP2022/087308, mailed Apr. 3, 2023 (German and English language document) (5 pages).

*Primary Examiner* — Yi-Kai Wang
(74) *Attorney, Agent, or Firm* — Maginot, Moore & Beck LLP

(57) ABSTRACT

A method is for operating a braking system including a primary braking actuator having a first control apparatus. The primary braking actuator is operated based on a first braking specification. The braking system further includes a secondary braking actuator having a second control apparatus. The first control apparatus and the second control apparatus and/or a further control apparatus are connected to one another by a communication device. The second control apparatus and/or the further control apparatus checks whether signals from the first control apparatus are received in the second control apparatus and/or the further control apparatus, or whether the signals received from the first
(Continued)

control apparatus in the second control apparatus and/or the further control apparatus are faulty. When there are no received signals or when there are faulty signals, operation of the secondary braking actuator is enabled or prevented based on a second braking specification.

11 Claims, 2 Drawing Sheets

(58) Field of Classification Search
USPC ........................................................... 701/70
See application file for complete search history.

(56) References Cited

U.S. PATENT DOCUMENTS

| 2017/0297546 A1* | 10/2017 | Takeda .................... B60T 17/18 |
| 2022/0105911 A1* | 4/2022 | Haverkamp ........ B60T 8/17551 |

FOREIGN PATENT DOCUMENTS

| JP | 2002-178899 A | 6/2002 |
| JP | 2009-40290 A | 2/2009 |
| JP | 2009-227103 A | 10/2009 |
| WO | 2016/136671 A1 | 9/2016 |
| WO | 2020/207871 A1 | 10/2020 |

* cited by examiner

METHOD FOR OPERATING A BRAKING SYSTEM AND A BRAKING SYSTEM

This application is a 35 U.S.C. § 371 National Stage Application of PCT/EP2022/087308, filed on Dec. 21, 2022, which claims the benefit of priority to Serial No. DE 10 2021 215 005.5, filed on Dec. 23, 2021 in Germany, the disclosures of which are incorporated herein by reference in their entirety.

BACKGROUND

DE 10 2009 001 135 A1 discloses methods for actuating a hydraulic vehicle braking arrangement comprising an electromechanical brake booster and a wheel slip control means. The disclosure proposes that the vehicle braking arrangement is actuated using the brake booster in situations in which a brake pedal is not actuated, for example for limiting a vehicle speed, controlling the distance to a preceding vehicle, or when parking.

SUMMARY

The disclosure relates to a method for operating a braking system comprising a primary braking actuator having a first control apparatus, which primary braking actuator is operated on the basis of a first braking specification, and comprising a secondary braking actuator having a second control apparatus.

The first control apparatus and the second control apparatus and/or a further control apparatus are connected to one another via communication means. The second control apparatus and/or the further control apparatus check whether signals from the first control apparatus are received in the second control apparatus and/or the further control apparatus, or whether the signals received from the first control apparatus in the second control apparatus and/or the further control apparatus are faulty. If there are no signals or if there are faulty signals from the first control apparatus, operation of the secondary braking actuator is enabled or prevented on the basis of a second braking specification.

This has the advantage that in a brake-by-wire braking system comprising a first brake pressure generator, for example an electrically actuated plunger or a brake booster, and a second brake pressure generator, for example a hydraulic assembly, known as an ESP assembly, both units, which are able to generate brake pressure, are optimized with regard to the interaction thereof. It is particularly important that the two units are able to communicate with each other and, if this is not/no longer possible, that there are adequate fallback levels so that the vehicle can continue to be decelerated sufficiently. This increases the safety of the braking system. This is particularly significant in brake-by-wire braking systems if there is no longer a mechanical-hydraulic fallback level on the basis of a driver braking force for deceleration by the driver. If a communication problem is identified, operation of the secondary braking actuator may be intentionally enabled, but may also be prevented. This makes it possible to operate both braking actuators in a manner appropriate to the situation.

In a configuration of the disclosure, the primary braking actuator is operated on the basis of the first braking specification by way of a first characteristic curve corresponding to a relationship between the first braking specification and an internal a control variable to be set of the primary braking actuator, in particular a rod path, a transmission power or a motor current. The fact that the first braking actuator may be operated on the basis of a first brake pressure specification and the second braking actuator may be operated by means of a second braking specification has the advantage that, even in the event of a communication failure, both braking actuators are each able to implement the braking specification on the basis of their own directly provided braking specification, even in the event of a failure in the communication system or faulty signals. This increases the overall availability of the braking actuators and makes it possible to achieve greater reliability in the implementation of braking specifications and thus the redundancy of the braking system.

In a further form of the method, a fault identification procedure is performed by means of the second control apparatus and/or the further control apparatus and an appropriate replacement response is initiated. Fault identification makes it possible to tailor the reaction to the communication problems identified. If, as part of the fault identification procedure, it is identified that the primary braking actuator is still intact, then there is no need, despite the communication failure, to dispense with operation of the primary braking actuator, which is usually intended for pressure build-up. If, however, the fault identification procedure reveals that there are problems with or relating to the primary braking actuator, then the secondary braking actuator may be utilized in a manner appropriate to the situation.

Advantageously, for the purposes of fault identification, a brake pressure set by means of the primary braking actuator based on a first braking specification is read in by means of the second control apparatus or by means of the further control apparatus. Using the read-in brake pressure, the second control apparatus or the further control apparatus performs a plausibility check of the brake pressure using the second braking specification present in the second control apparatus or the further control apparatus. This has the advantage that a plausibility check of a pressure generated by a first braking actuator based on a first braking specification can be carried out by the second braking actuator, using the second braking specification received thereby. In this way, it is possible to avoid the communication failure.

Furthermore, in an advantageous configuration of the method, the plausibility check may be carried out on the basis of a second characteristic curve and/or a characteristic map which defines a relationship between the brake pressure and the second braking specification. Providing a characteristic curve, which makes it possible to obtain a target brake pressure using a second braking specification in the secondary braking actuator or a further brake control apparatus, independently of the first braking specification, increases reliability.

In a further configuration, the first braking specification and the second braking specification are identical. In particular, the first braking specification and the second braking specification have an identical source. This has the advantage that the first and second braking specifications are the same variables, but are provided to independent braking actuators twice in different ways. In this way, the reliability of the braking system can be increased by an appropriate plausibility check.

It is further advantageous that, as part of the fault identification procedure, in the event that no pressure is detected or an expected pressure is not detected during the plausibility check, a first fault status is set indicating a defect in the primary braking actuator. In this way, the plausibility check as to whether there is any pressure at all or whether it is insufficient can be used to allocate the fault to the primary braking factor.

Furthermore, a fault relating to the communication means or in the communication device of the primary braking actuator may also be indicated as the first fault status. This makes it possible not only to detect a defective primary braking actuator, but also to establish in the first fault status that the communication means are not functioning.

In an advantageous configuration, the operation of the secondary braking actuator is enabled on the basis of the second braking specification (6b, 11b) as a replacement response (304) in the form of a complete takeover, by the secondary braking actuator, of the setting of the brake pressure if no pressure is detected as part of the plausibility check. Alternatively, the operation of the secondary braking actuator is enabled as a replacement response in the form of an at least partial takeover of the setting of the brake pressure if an expected pressure is not detected, in particular an expected pressure within a tolerance range of a characteristic curve between the pressure and the braking specification. A takeover by the secondary braking actuator as a replacement response can thus always be enabled to the extent required.

In a further configuration, in the event that an expected pressure, in particular an expected pressure within a tolerance range of a characteristic curve between the pressure and the braking specification, is detected during the plausibility check, a second fault status indicating a fault in the communication means (7) is set as part of the fault identification procedure. This has the advantage that it is thus also possible to detect that the primary braking actuator is functional and the faults are solely the result of a communication problem.

In an advantageous configuration, as a replacement response, the setting of the pressure by the secondary braking actuator is then prevented and is continued by the primary braking actuator. In this way, operation of the primary braking actuator, which is usually also intended to generate brake pressure, may be continued. The secondary braking actuator does not take over in this situation.

The disclosure further relates to a braking system having a primary braking actuator comprising a first control apparatus and having a secondary braking actuator comprising a second control apparatus. Furthermore, a further control apparatus may be provided, wherein the control apparatuses are configured to perform the method as described herein.

BRIEF DESCRIPTION OF THE DRAWINGS

An embodiment of the disclosure is described in the following with reference to the figures, in which.

DETAILED DESCRIPTION

Figure 1:
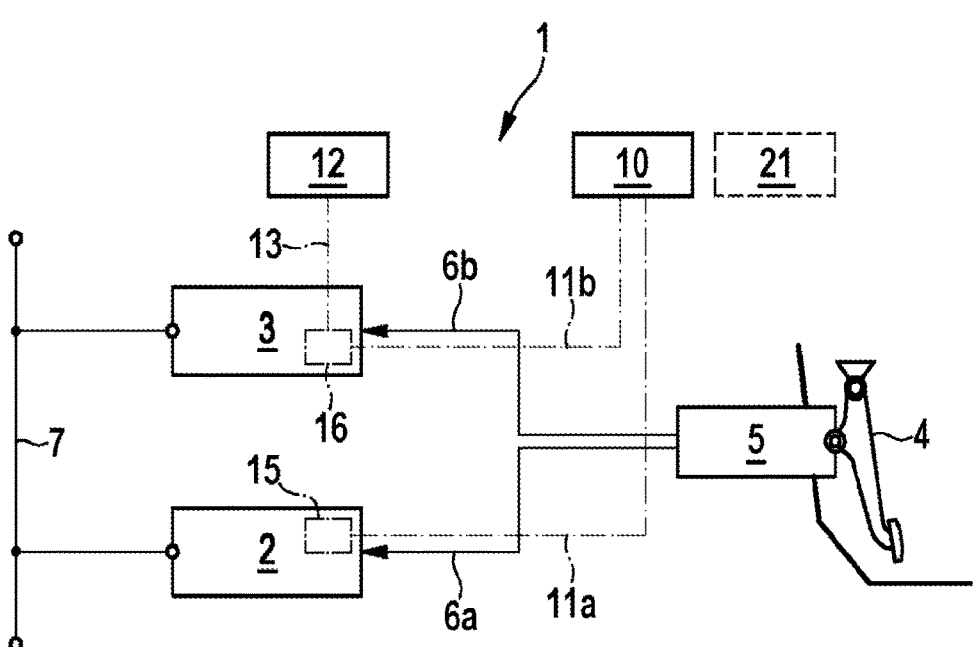
FIG. 1 shows a schematic illustration of a braking system.

FIG. 1 shows a schematic illustration of a braking system 1 of a vehicle. The braking system 1 comprises a primary braking actuator 2 and a secondary braking actuator 3. A primary braking actuator 2 may, for example, be an electromechanical braking actuator 2 which can generate a brake pressure in wheel brakes of a vehicle by means of a hydraulic fluid. An electromechanical braking actuator 2 may be provided in the form of an electromechanical brake booster. A primary braking actuator 2 may also be understood to mean an electrically actuated plunger piston which can also build up brake pressure in connected wheel brakes. In contrast to a brake booster, in such a plunger system, the electrically actuated plunger and the driver do not jointly act on the wheel brakes, at least in normal operation. Instead, the driver acts on a pedal simulator and thereby generates a braking specification, wherein this braking specification is then implemented on the wheel brakes by the electrically actuated plunger.

Hydraulic pressure may be generated for example in a brake master cylinder of a braking system of a motor vehicle. Such a brake master cylinder is usually positioned hydraulically downstream of a secondary braking actuator 3. Such a secondary braking actuator 3 may, for example, be a hydraulic assembly of a brake pressure modulation unit. A brake pressure modulation unit may, for example, be understood to mean an ESP system.

The braking system 1 is able to provide brake pressure in both a driver-dependent and a driver-independent manner.

In the case of a driver-independent braking specification 11a, 11b, the braking specification is generated by a system 10 of the vehicle. In this case, a braking request from the system is usually implemented. Examples of such systems include, among others, hill start assists, traffic jam assists, or automatic distance control. Actuation of the brake, for example via a brake pedal by the driver, is not converted directly into a braking effect, but can be taken into account. The system 10 may in this case be a system 10 at an equivalent level to the braking system 1, for example a driver assistance system with suitable distance and environmental detection sensor systems, or a higher-level system 10, for example an overall vehicle control system, which comprises the braking system and the driver assistance system or is connected to and communicates with these systems via communication means.

In the case of a driver-dependent braking specification 6a, 6b, the brake pressure generated by the primary 2 or the secondary 3 braking actuator depends on the actuation of an actuating element 4 by the driver, for example the actuation of a braking pedal 4. This actuation is then converted into a corresponding brake pressure by means of the primary and/or secondary braking actuator 2, 3. A braking request specification 6a, 6b from the driver may also be provided via other actuating elements 4, for example a rotary knob, a slider, or a lever.

A braking specification via the actuating element 4 may take the form of the extent to which the actuating element 4 is actuated by the driver and is determined by a control unit 5—by means of suitable sensors. A variable for determining the driver specification may, for example, be a deflection path and/or an actuating force. A variable for determining the driver specification may also be or be derived from a variable based on the deflection path and/or actuating force.

The control unit 5 passes the driver-dependent braking specification to the respective control apparatuses 15 and 16 of the primary 2 and secondary 3 braking actuator as follows: the driver specification 6a is passed to the control apparatus 15 of the primary braking actuator 2 and the driver specification 6b is passed to the control apparatus 16 of the secondary braking actuator 3, respectively. In this case, the braking specifications 6a and 6b are identical variables and are each supplied to the primary braking actuator 2 and the secondary braking actuator 3, respectively, for redundancy purposes.

The further system 10 passes the driver-independent braking specification 11a and 11b to the respective control apparatuses 15, 16 of the primary 2 and secondary 3 braking actuator in the form of the driver specification 11a being passed to the control apparatus 15 of the primary braking actuator 2 and the specification 11*b* is passed to the control apparatus 16 of the secondary braking actuator 3, respectively. The braking specifications 11*a* and 11*b* are also identical variables and are supplied to the primary braking actuator 2 and the secondary braking actuator 3, respectively, for redundancy purposes.

In the following, the term "braking specification" will be used both in the case of a driver-dependent braking specification 6*a*, 6*b*, and in the case of a driver-independent braking specification 11*a*, 11*b*.

The control apparatuses 15 and 16 of the primary 2 and secondary 3 braking actuator are connected to each other via a communication system 7, for example via a communication bus 7. The braking actuators 2, 3 involved can exchange signals with each other directly via such a communication system 7. For example, the primary braking actuator 2 may thus transmit a fault state 8 directly to the secondary braking actuator 3. If the primary braking actuator 2 transmits a fault state 8 to the secondary braking actuator 3, the secondary braking actuator 3 may, for example, take over or continue the braking operation previously performed by or using the primary braking actuator 2. Such a function is also referred to as hydraulic boost compensation HBC. A braking specification 6*a*, 11*a* present in the primary braking actuator 2 may in this case also be transferred to the secondary braking actuator 3 via the communication system 7 in order to take over the setting of the brake pressure accordingly.

However, if the communication via the communication system 7 fails or becomes faulty, it is no longer possible to reliably pass the braking specification on in this way.

The control apparatus 16 of the secondary braking actuator 3 therefore comprises a monitoring function which is able to identify a communication failure via the communication system 7 or detect faulty signals transferred via the communication system 7. Faulty signals are understood to mean signals which do not fall within a predetermined, plausible range of values provided for a variable. A signal may also contain faults if the state thereof is marked or defined as implausible (for example via a set bit or an index). In this way, the secondary braking actuator 3 may be used to infer communication problems with the primary braking actuator 2.

A failure to receive information, or faults in the receipt of signals in the secondary braking actuator 3 may have a plurality of causes. On the one hand, the primary braking actuator 2 may have failed and may therefore no longer be able to send information.

On the other hand, the communication system 7 itself may have a fault or have failed, for example due to mechanical disconnection.

Fault identification, i.e., assigning a fault to a communication system failure or failure of the primary braking actuator 2, thus cannot be accomplished with a single bus connection alone.

A method which makes such fault identification possible is described in the following.

It is assumed that the primary braking actuator 2 is initially solely responsible for building up or setting the pressure, and that the braking specification 6*a*, 11*a* and 6*b*, 11*b* are supplied to both the primary 2 and the secondary 3 braking actuators, respectively. It should be noted that the braking specifications are supplied directly to the primary 2 and secondary 3 braking actuator.

In a first step 301, the control apparatus 16 of the secondary braking actuator 3 monitors whether any information is received from the primary braking actuator 2 via the communication system 7 or whether faulty signals are received via the communication system 7.

If there are no signals or there are faulty signals from the primary braking actuator 2, the braking system transitions to an operating mode in which operation of the secondary braking actuator 3 is enabled or prevented based on the braking specification 6*b*, 11*b* provided thereto for setting the brake pressure.

Initially, in the event of a communication failure or faulty signals, operation of the secondary actuator 3 can be enabled (step 301*a*). For this purpose, the secondary actuator 3 can detect the brake pressure 13 in the braking system 1 and compare it to the braking specification 6*b*, 11*b*. This can be carried out on the basis of a characteristic curve 17, which is described in the following paragraphs and is therefore not described at this point. If the brake pressure 13 differs from the brake pressure expected on the basis of the braking specification 6*b*, 11*b*, and the characteristic curve 17, taking tolerances into account if necessary, the missing brake pressure may be applied by the secondary braking actuator. Since the pressure 13 is continuously read into and is present in the control apparatus 16 of the secondary actuator, a brake pressure corresponding to the second braking specification 6*b*, 11*b* can consequently always be established. In this case, the status of the primary braking actuator 2 may remain undetermined as to whether it is no longer able to communicate, or is no longer able to communicate without faults, with the secondary actuator via the communication system 7.

Figure 4:
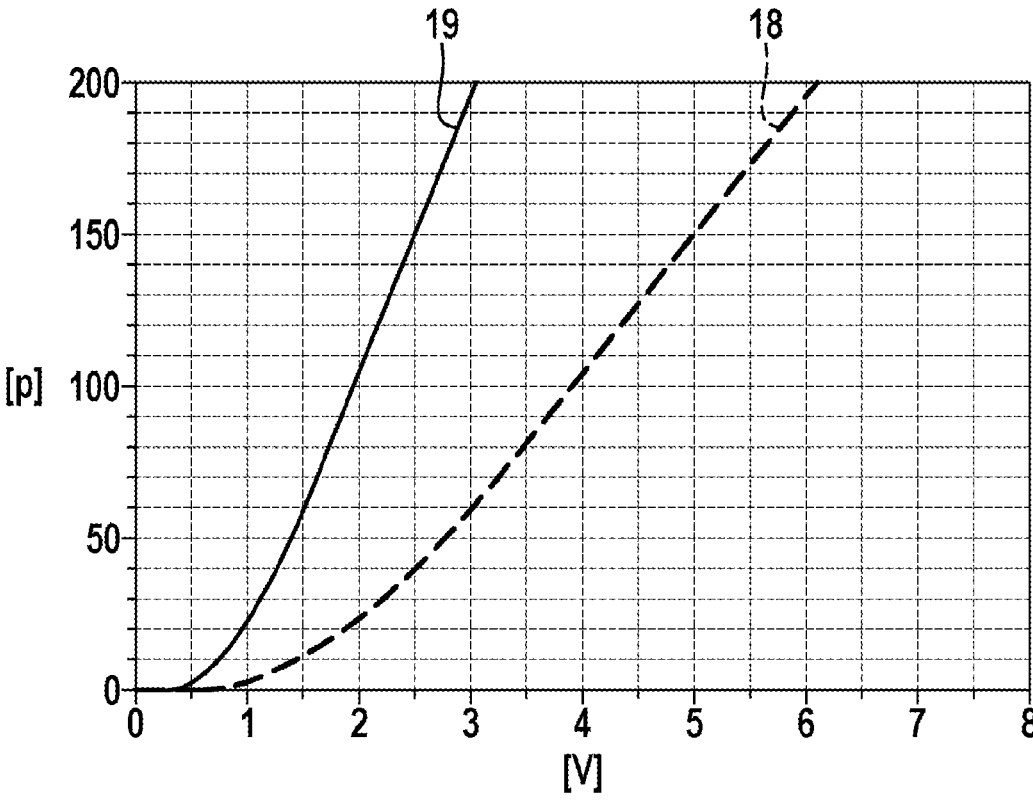
FIG. 4 shows two pressure-volume relationships of the primary braking actuator.

In other words, each braking actuator 2, 3 generates a brake pressure using its own braking specification 6*a*, 11*a* and 6*b*, 11*b* respectively, which has been provided thereto. The secondary braking actuator 3 can establish the desired brake pressure, taking into account the prevailing brake pressure 13 measured. The primary braking actuator 2 generates a brake pressure through control on the basis of an internal variable of the primary braking actuator 2. In this case, a further characteristic curve may be used which describes the braking specification 6*a*, 11*a* thereof in relation to an actuation variable of the primary braking actuator. Such an actuation variable may, for example, be a rod path (for example the output rod of the primary braking actuator), a transmission power, or a motor current of the primary braking actuator. The internal variables, which can be used as a basis for adjustments, are directly related to a pressure generated, which is shown using the example of two pressure-volume characteristic curves 18, 19 in FIG. 4. The volume V which is displaced during actuation of the brake is proportional to the rod path s in accordance with the relationship V=A*s, wherein A=the surface area of the cylinder from which the volume is displaced. The two pressure-volume characteristic curves shown are provided as examples of a front wheel and a rear wheel respectively, the brakes of which are each connected to a brake cylinder actuated by the primary braking actuator 2.

The next method step 302 may be carried out either directly after a communication failure or faulty signals have been identified, i.e., after step 301, or also downstream of the step 301*a* already described.

Since no signals are received or faulty signals are received from the primary braking actuator 2 by the secondary braking actuator 3, additional monitoring can be performed in a subsequent step 302 in the form of a plausibility check of the prevailing brake pressure 13 using the braking specification 6*b*, 11*b* supplied to the secondary braking actuator 3. This monitoring procedure also runs on the control apparatus 16 of the secondary braking actuator 3. This monitoring procedure is used to investigate where the fault lies in the braking system 1, in other words, for fault identification.

In the control apparatus 16 of the secondary braking actuator 3, the brake pressure 13 built up by means of the primary braking actuator 2 is monitored. The brake pressure built up by means of the primary braking actuator 2 may be determined by means of a pressure sensor 12 of the braking system 1, which can detect the resulting pressure 13 in the brake master cylinder or at another suitable point in the braking system 1. For example, an ESP brake pressure sensor provides a signal corresponding to the brake master cylinder.

The brake pressure detected may then be compared in the control apparatus 16 of the secondary braking actuator 3 to a driver-dependent or driver-independent braking specification 6b, 11b present. A comparison of this type may be carried out for example by means of a characteristic map or a characteristic curve 17 which has been stored in the vehicle in advance. Such a characteristic map or curve 17 need not necessarily be provided in the vehicle in a fixed manner; it may also be updated during ongoing operation or at certain intervals, for example in the event of ignition-on or inspections. Characteristic curves or characteristic maps of this type may also be adapted by selecting a driving mode of the vehicle. For example, a selector switch in the vehicle may thus be used to operate a vehicle in a sports mode and in a comfort mode.

Figure 2:
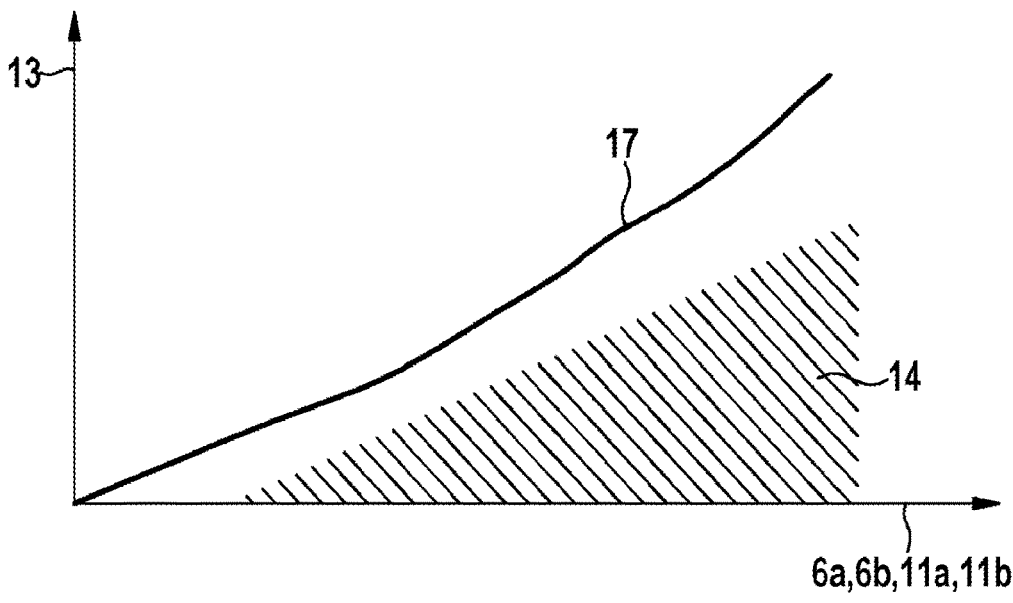
FIG. 2 shows a characteristic curve for use in a braking system.
Figure 3:
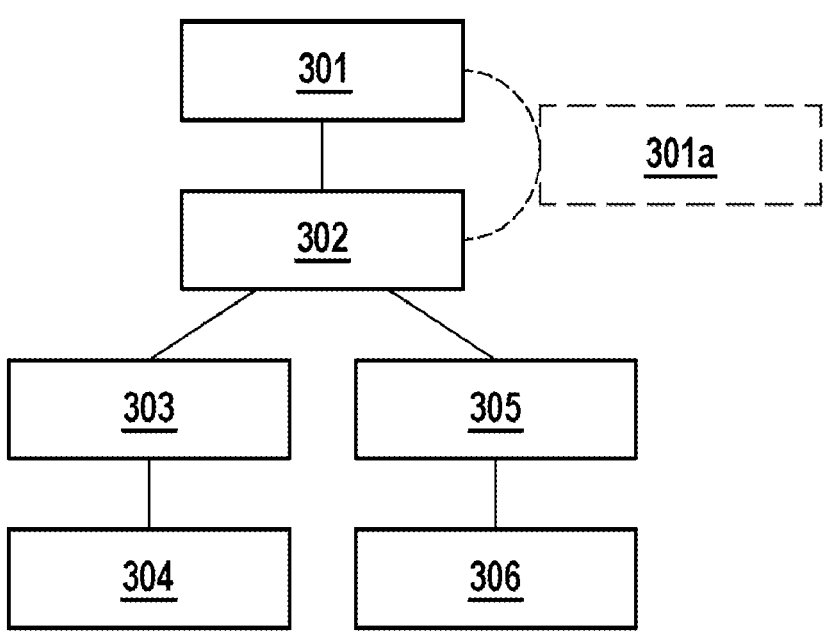
FIG. 3 shows a flowchart of a method.

An example of a characteristic curve 17 is shown in FIG. 2. FIG. 2 shows a course of the characteristic curve 17 for the brake pressure 13 as a function of the braking specification 6a, 6b, 11a, 11b. The brake pressure 13 rises as the braking specification 6a, 6b, 11a, 11b increases. Such a characteristic curve 17 may be specified so as to be identical for driver-dependent and driver-independent braking specifications 6a, 6b, 11a, 11b, but they may also differ from one another. Only one characteristic curve 17 is shown here by way of example.

The aforementioned plausibility check is carried out on the basis of the described characteristic curve 17 in FIG. 2, which specifies a relationship between the braking specification(s) 6a, 6b, 11a, 11b and the desired pressure 13. The plausibility check can be carried out in such a way that pressure in a certain tolerance range around the characteristic curve is still classified as acceptable and is not classified as unacceptable until it falls within a range 14 below the characteristic curve.

If a plausibility check in the following step 303 indicates that no pressure 13 is measured, or alternatively an unacceptable pressure 13 is measured, even though there is a braking specification 6b, 11b specifying a target brake pressure to be set, then it is assumed that there is a failure relating to the primary braking actuator 2. In other words, if no pressure or insufficient pressure is achieved, it is to be assumed that there is a defect in the primary braking actuator 2. A decision is then likewise also made as to whether there is a fault in the bus communication 7 or in the communication device of the primary braking actuator 2. This is because, in the event of a defect relating to the primary braking actuator 2, the latter would in fact have to send a corresponding fault message, via the communication device thereof and also via the bus communication 7, to the secondary braking actuator 3, in particular to the control apparatus 16 thereof.

In a subsequent step 304, an appropriate replacement response can be triggered. In the replacement response, if there is no brake pressure, the pressure build-up is completely taken over by the secondary braking actuator 3. In the replacement response, if there is still brake pressure but it is no longer acceptable with regard to the characteristic curve 17 and the tolerance range thereof, the secondary braking actuator 3 takes over, at least in part, the brake pressure build-up or setting, wherein a brake pressure 13 present in accordance with the characteristic curve 17 and associated with the braking specification 6b, 11b supplied to the secondary braking actuator 3 is set or adjusted. To set the brake pressure 13, the secondary braking actuator may be used to make adjustments on the basis of the brake pressure signal 13. Whether or not the at least partial adjustment of the brake pressure using both braking actuators 2 and 3 is enabled may thus be linked to a plausibility check, and this may not apply in all operating situations.

If, in the plausibility check in step 305, a correct pressure 13 is set, or in view of the characteristic curve 17 and the existing tolerance range, a correct pressure 13 is set, it is decided that there is a fault solely in the bus communication 7. It is assumed that the primary braking actuator 2 is then intact. In this case, as a replacement response 306, the brake pressure build-up is left to the primary braking actuator 2 and is not taken over by the secondary braking actuator 3. A takeover by the secondary braking actuator 3 is therefore prevented.

The method described above may run and be applied in the vehicle for an unlimited period of time.

In the embodiment described thus far, it was assumed that the monitoring of the brake pressure 13 and the fault identification procedure are carried out in the control apparatus 16 of the secondary braking actuator 3.

In other embodiments, the analysis as to whether the brake pressure 13, which is generated by means of the primary braking actuator 2 and is determined by means of the secondary braking actuator 3 and an associated brake pressure sensor 12, matches the braking specification 6b, 11b may also be carried out by control apparatuses other than the control apparatus 16 of the second braking actuator 3. The further steps of the method described may also take place on other control apparatuses. Furthermore, it is possible for certain method steps to run on one control apparatus and other steps to run on at least a further control apparatus. For this purpose, the signals required must be provided to the control apparatuses involved.

On the one hand, another control apparatus located in the vehicle may take over the method steps at least in part, for example a control apparatus 10, which is responsible for driver assistance functions, or alternatively a higher-level control apparatus which is for example a central computer of the vehicle. The data required to perform the analysis on another control apparatus, for example the brake pressure 13 and the braking specification 6b, 11b, can be provided to the further control apparatus 10 via suitable communication channels, for example via the communication network 7 (bus system). Wireless data transfer within the vehicle is also possible.

It is also conceivable that the analysis as to whether the brake pressure 13 achieved corresponds to the braking specification 6b, 11b, and also further method steps, is carried out outside the vehicle, for example in an off-board control apparatus 21 or computer, wherein the off-board control apparatus 21 or the computer then uses corresponding data of the vehicle. Data of this type would be the brake pressure 13 achieved and the braking specification 6b, 11b. For this purpose, the braking request specification 6b, 11b may then also be provided directly to the off-board control apparatus 21 or computer. It is also possible, however, that the braking specification 6*b*, 11*b* is still provided to the secondary braking actuator 3 and transmitted by the latter to the off-board control apparatus 21 or computer.

Data can be transferred to off-board control apparatuses, for example to a cloud, via suitable communication means, for example data connections via the internet.

A replacement response in the event of the failure of the primary braking actuator 2, as shown in the first embodiment, can still be carried out using the secondary braking actuator 3, both in the case of further control apparatuses 10 within the vehicle and in the case of off-board control apparatuses 21 or computers. A partial replacement response may also be carried out by the secondary braking actuator 3 if the primary braking actuator 2 is still partially generating brake pressure. In other words, the secondary braking actuator 3 compensates for a difference between the target brake pressure and the brake pressure generated by the primary braking actuator, as already described with regard to the first embodiment.

In the event that the braking system 1 comprises further brake components in addition to the hydraulic adjusters or actuators, i.e., in addition to the primary braking actuator 2 and the secondary braking actuator 3, these components may also be used for a replacement response. Further brake components of this type may, for example, be an electrically actuable parking brake, an electromotive brake arranged on at least one wheel to be braked, or a generator of an e- or hybrid vehicle which produces a braking effect during recuperation. If additional brake adjusters, for example parking brakes, generators, or electromotive brakes, are used for a replacement response, the hydraulic pressure of the primary braking actuator 2 and the secondary braking actuator 3 may then only be jointly set to a partial extent, where applicable. In this case, it is necessary to take into account the total or at least additional supplementary contribution of the further adjuster.

The invention claimed is:

1. A method for operating a braking system comprising a primary braking actuator having a first control apparatus and a secondary braking actuator having a second control apparatus, comprising:

operating the primary braking actuator based on a first braking specification;

connecting the first control apparatus and the second control apparatus and/or a further control apparatus to one another using a communication device;

checking, using the second control apparatus and/or the further control apparatus, whether signals from the first control apparatus are received in the second control apparatus and/or the further control apparatus, and whether the signals received from the first control apparatus in the second control apparatus and/or the further control apparatus are faulty; and enabling or preventing operation of the secondary braking actuator based on a second braking specification when there are no received signals or when there are faulty signals from the first control apparatus, wherein the first braking specification and the second braking specification are identical, and wherein the first braking specification and the second braking specification have an identical source.

2. The method according to claim 1, further comprising:

operating the primary braking actuator based on the first braking specification by way of a first characteristic curve corresponding to a relationship between the first braking specification and an internal control variable to be set of the primary braking actuator, wherein the internal control variable corresponds to a rod path, a transmission power, or a motor current of the primary braking actuator.

3. The method according to claim 1, further comprising:

performing a fault identification procedure using the second control apparatus and/or the further control apparatus; and initiating a replacement response.

4. The method according to claim 3, wherein, for purposes of performing the fault identification procedure, a brake pressure set by the primary braking actuator based on the first braking specification is read in using the second control apparatus or the further control apparatus, and the second control apparatus or the further control apparatus carries out a plausibility check of the brake pressure determined using the second braking specification present in the second control apparatus or the further control apparatus.

5. The method according to claim 4, further comprising:

carrying out the plausibility check based on a second characteristic curve and/or a characteristic map which defines a relationship between the brake pressure and the second braking specification.

6. The method according to claim 4, wherein, as part of the fault identification procedure, when no pressure is detected or an expected pressure is not detected during the plausibility check, a first fault status is set indicating a defect in the primary braking actuator.

7. The method according to claim 6, wherein a fault relating to the communication device or in a communication device of the primary braking actuator is also indicated as the first fault status.

8. The method according to claim 6, wherein the operation of the secondary braking actuator is enabled based on the second braking specification as a replacement response:

as a complete takeover, by the secondary braking actuator, of the setting of the brake pressure, when no pressure is detected as part of the plausibility check, and as an at least partial takeover of the setting of the brake pressure, when an expected pressure is not detected within a tolerance range of a characteristic curve between the brake pressure and the second braking specification.

9. The method according to claim 4, wherein, when an expected pressure within a tolerance range of a characteristic curve between the brake pressure and the second braking specification is detected during the plausibility check, a second fault status indicating a fault in the communication device is set as part of the fault identification procedure.

10. The method according to claim 9, wherein, as a replacement response, the setting of the brake pressure by the secondary braking actuator is prevented and is continued by the primary braking actuator.

11. A braking system comprising:

a primary braking actuator comprising a first control apparatus; and a secondary braking actuator comprising a second and/or further control apparatus, wherein the first control apparatus and the second and/or further control apparatus are configured to perform the method according to claim 1.

* * * * *